US010422341B2

(12) United States Patent
Brault et al.

(10) Patent No.: US 10,422,341 B2
(45) Date of Patent: Sep. 24, 2019

(54) FRONT ENCLOSURE WHICH IS SEALED DURING THE MODULAR DISMANTLING OF A TURBOJET WITH REDUCTION GEAR

(71) Applicant: SNECMA, Paris (FR)

(72) Inventors: Michel Gilbert Roland Brault, Moissy-Cramayel (FR); Nathalie Nowakowski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 489 days.

(21) Appl. No.: 15/037,151

(22) PCT Filed: Nov. 13, 2014

(86) PCT No.: PCT/FR2014/052899
§ 371 (c)(1),
(2) Date: May 17, 2016

(87) PCT Pub. No.: WO2015/075355
PCT Pub. Date: May 28, 2015

(65) Prior Publication Data
US 2016/0298639 A1 Oct. 13, 2016

(30) Foreign Application Priority Data
Nov. 21, 2013 (FR) ...................... 13 61468

(51) Int. Cl.
F04D 29/054 (2006.01)
F01D 25/16 (2006.01)
(Continued)

(52) U.S. Cl.
CPC ........... F04D 29/054 (2013.01); F01D 25/16 (2013.01); F01D 25/18 (2013.01); F02C 3/067 (2013.01);
(Continued)

(58) Field of Classification Search
CPC .......... F01D 25/16; F01D 25/18; F01D 15/12; F02C 3/067; F02C 3/107; F02C 7/06;
(Continued)

(56) References Cited

U.S. PATENT DOCUMENTS 4,849,895 A * 7/1989 Kervistin ................ F01D 11/24
701/100
6,158,210 A * 12/2000 Orlando .................. F02C 3/067
29/889.2

(Continued)

FOREIGN PATENT DOCUMENTS

EP 2 535 528 A2 12/2012

OTHER PUBLICATIONS

Written Opinion of the International Searching Authority, dated Mar. 30, 2015, issued in corresponding International Application No. PCT/FR2014/052899, filed Nov. 13, 2014, 5 pages.

(Continued)

Primary Examiner — Justin D Seabe
Assistant Examiner — Brian Christopher Delrue
(74) Attorney, Agent, or Firm — Christensen O'Connor Johnson Kindness PLLC

(57) ABSTRACT

The invention relates to a turbofan engine comprising a fan driven, via a fan shaft supported by at least two first bearings, by a turbine shaft supported by at least one second bearing comprising a stationary ring and a movable ring, said turbine shaft driving said fan shaft through a device for reducing the speed of rotation, said device for reducing the speed of rotation and said first and second bearings being housed in a lubrication enclosure in which the shell comprises stationary portions and movable portions connected to one another by sealing means, said reducing device comprising an inducer shaped so as to receive the torque transmitted by said turbine shaft via driving means con-
(Continued)

nected to said movable ring, wherein the lubrication enclosure forms a coaxial ring with the turbine shaft and said driving means comprise a girth gear which is part of the movable sealing walls of the shell of the lubrication enclosure.

12 Claims, 3 Drawing Sheets

(51) Int. Cl.
| | | |
|---|---|---|
| F01D 25/18 | (2006.01) | |
| F02K 3/06 | (2006.01) | |
| F02C 3/067 | (2006.01) | |
| F02C 3/107 | (2006.01) | |
| F02C 7/06 | (2006.01) | |
| F02C 7/36 | (2006.01) | |
| F04D 19/00 | (2006.01) | |
| F04D 25/04 | (2006.01) | |
| F04D 29/056 | (2006.01) | |
| F04D 29/063 | (2006.01) | |
| F04D 29/10 | (2006.01) | |

(52) U.S. Cl.
CPC .............. *F02C 3/107* (2013.01); *F02C 7/06* (2013.01); *F02C 7/36* (2013.01); *F02K 3/06* (2013.01); *F04D 19/002* (2013.01); *F04D 25/045* (2013.01); *F04D 29/056* (2013.01); *F04D 29/063* (2013.01); *F04D 29/102* (2013.01); *F05D 2220/323* (2013.01); *F05D 2240/60* (2013.01); *F05D 2260/40311* (2013.01)

(58) Field of Classification Search
CPC . F02C 7/36; F02K 3/06; F04D 29/054; F04D 19/002; F04D 25/045; F04D 29/056; F04D 29/063; F04D 29/102; F04D 25/163; F05D 2220/323; F05D 2240/60; F05D 2260/40311; F05D 2620/4031
USPC ....................................................... 415/122.1
See application file for complete search history.

(56) References Cited

U.S. PATENT DOCUMENTS

| | | | | |
|---|---|---|---|---|
| 7,493,753 | B2* | 2/2009 | Moniz | F01D 25/16 415/9 |
| 7,661,260 | B2* | 2/2010 | Moniz | F01D 5/026 60/226.1 |
| 7,726,021 | B2* | 6/2010 | Barnett | B23P 6/005 277/412 |
| 7,966,806 | B2* | 6/2011 | Henry | F02C 3/067 60/226.1 |
| 8,402,741 | B1* | 3/2013 | Merry | F01D 25/16 60/226.1 |
| 8,561,383 | B2* | 10/2013 | Suciu | F02C 3/113 60/226.1 |
| 8,672,801 | B2* | 3/2014 | McCune | F01D 25/164 475/346 |
| 8,997,500 | B2* | 4/2015 | Glahn | F01D 15/12 184/6.11 |
| 9,038,366 | B2* | 5/2015 | Merry | F01D 25/162 60/226.1 |
| 9,410,483 | B2* | 8/2016 | Munsell | F01D 25/16 |
| 2006/0059887 | A1* | 3/2006 | Klingels | F02K 3/06 60/204 |
| 2007/0173078 | A1* | 7/2007 | Reck | H01R 35/025 439/15 |
| 2008/0006018 | A1* | 1/2008 | Sheridan | F01D 25/18 60/39.1 |
| 2009/0081039 | A1* | 3/2009 | McCune | F02C 7/04 415/214.1 |
| 2009/0090096 | A1* | 4/2009 | Sheridan | F02C 7/36 60/226.3 |
| 2011/0130246 | A1* | 6/2011 | McCune | F01D 25/164 477/115 |
| 2012/0195753 | A1* | 8/2012 | Davis | F01D 25/16 415/229 |
| 2012/0237334 | A1* | 9/2012 | McCune | F01D 5/027 415/122.1 |
| 2012/0277055 | A1* | 11/2012 | Sheridan | F01D 25/16 475/331 |
| 2013/0177385 | A1* | 7/2013 | Munsell | F01D 25/16 415/1 |
| 2013/0323047 | A1* | 12/2013 | Van Duyn | F01D 25/16 415/229 |
| 2014/0119913 | A1* | 5/2014 | Demitraszek, Sr. | F01D 25/16 415/229 |
| 2014/0165534 | A1* | 6/2014 | Hasel | F02C 3/107 60/226.1 |
| 2014/0169941 | A1* | 6/2014 | DiBenedetto | F01D 25/18 415/111 |
| 2014/0230403 | A1* | 8/2014 | Merry | F02K 3/04 60/226.1 |
| 2015/0285090 | A1* | 10/2015 | Munsell | F01D 15/12 415/1 |
| 2015/0345321 | A1* | 12/2015 | McCune | F01D 5/027 417/374 |
| 2016/0003090 | A1* | 1/2016 | Lin | F02C 7/36 60/39.08 |
| 2016/0097331 | A1* | 4/2016 | Venter | F01D 15/12 415/122.1 |
| 2016/0108808 | A1* | 4/2016 | Sheridan | F02C 3/06 60/805 |
| 2016/0177825 | A1* | 6/2016 | Burghardt | F01M 11/03 415/110 |
| 2016/0186608 | A1* | 6/2016 | Cigal | F01D 25/18 60/805 |
| 2016/0201848 | A1* | 7/2016 | Bordne | F01D 11/04 137/808 |
| 2016/0298548 | A1* | 10/2016 | Brault | F01D 5/025 |
| 2016/0363211 | A1* | 12/2016 | Bradley | F02C 3/04 |

OTHER PUBLICATIONS

International Preliminary Report on Patentability, dated May 24, 2016, issued in corresponding International Application No. PCT/FR2014/052899, filed Nov. 13, 2014, 1 page.
International Search Report dated Mar. 30, 2015, issued in corresponding International Application No. PCT/FR2014/052899, filed Nov. 13, 2014, 2 pages.

\* cited by examiner

FRONT ENCLOSURE WHICH IS SEALED DURING THE MODULAR DISMANTLING OF A TURBOJET WITH REDUCTION GEAR

TECHNICAL FIELD

Embodiments of the present disclosure relate to aeronautical turbine engines and, more specifically, turbojet engines comprising a reducer for driving the fan, or respectively the propeller.

BACKGROUND

Conventionally, turbine engines firstly comprise, starting from upstream, one or more compressor modules arranged in series, which compress the air sucked into an air inlet. The air is then introduced into a combustion chamber, where it is mixed with a fuel and burned. The combustion gases pass through one or more turbine modules which drive the compressor(s). The gases are lastly ejected either into an exhaust nozzle to produce a propulsive force or onto a free turbine to produce the power which is recovered from a propeller shaft.

The current bypass turbojet engines having a high bypass ratio, or turbofans, comprise a plurality of compressor stages, in particular a low-pressure compressor (LP) and a high-pressure compressor (HP) which belong to the primary body of the engine. Upstream of the low-pressure compressor, a large movable-blade wheel, or fan, is arranged, which supplies both the primary flow passing through the LP and HP compressors and the cold flow, or secondary flow, which is directed directly towards a cold-flow exhaust nozzle, referred to as the secondary exhaust nozzle. The fan is driven by the rotating shaft of the LP body and generally rotates at the same speed as the shaft. However, it may be advantageous to rotate the fan at a rotational speed which is less than that of the LP shaft, in particular when the fan is very large, in order to better adapt the fan aerodynamically. For this purpose, a reducer is arranged between the LP shaft and a fan shaft, which supports the fan. Such a design is described in particular in FR 1251655 and FR 1251656, which were filed on 23 Feb. 2012.

Modern turbine engines are conventionally produced in the form of an assembly of modules which can comprise fixed portions and movable portions. A module is defined as a sub-assembly of a turbine engine which has geometric features in the region of the interfaces thereof with the adjacent modules which are precise enough for the module to be able to be delivered individually, and which has been subjected to specific balancing when it comprises rotating portions. The assembly of the modules makes it possible to form a complete engine, by reducing as much as possible the balancing and pairing operations of the parts which interface with one another. The fan, the fan shaft and the reducer generally form part of the same module, which is referred to as a fan module.

The rotating parts, such as the rotating shaft(s), the compressor(s) and the turbine(s), are supported by structural parts, which are referred to as the intermediate casing at the front and the exhaust casing at the rear, by means of bearings which are enclosed in vessels for the lubrication and the cooling thereof. Turbine engines thus generally comprise at least two lubrication vessels, one located at the front, which contains the bearings positioned at the side of the compressors or the fan, and one located at the rear, which contains the bearings positioned at the side of the turbines. These vessels are formed by an assembly of movable walls and fixed walls, between which are positioned devices, of the labyrinth seal type, to ensure the required sealing therebetween.

In current turbine engines having reducers, the reducer is generally driven directly by the LP shaft, by means of splines formed on the front end portion of the shaft, which cooperate with a toothed wheel of the reducer which is positioned in the region of the inner cylindrical wall thereof.

This solution has a major disadvantage in that it is incompatible with the modularity which is desired for modern engines. Indeed, it is necessary to be able to disassemble the engine into a small number of large elements, which are referred to as major modules and are formed by assembling a plurality of basic modules. In this case, it is desirable to be able to decompose an engine, whether it be for pre-assembly or disassembly, into three major modules, a first major module being formed, upstream, by the low-pressure compressor modules, a second major module being formed by the high-pressure portions and a third major module being formed, downstream, by the low-pressure turbine modules.

In order to carry out this disassembly, it is necessary to disconnect the first major module of the LP shaft which either remains attached to the LP turbine module or is removed from the engine. The removal of the LP shaft thus breaks the continuity of the casing of the front sealed vessel and compromises the sealing thereof. The disassembly of the shaft is thus accompanied by a draining of the oil of the vessel, the amount of which is relatively large due to the lubrication to be carried out of the pinions of the reducer. Precautions must be taken by the maintenance staff in order to prevent the soiling created by this oil, which spreads in an uncontrollable manner and which it is advantageous to recover in order, among other things, to carry out subsequent reassembly.

Furthermore, when the vessel is open, external soiling, during maintenance, can contaminate the oil of the vessel. This problem has even more of an effect on the proper operation of a reducer having plain bearings, by comparison with rolling bearings, the reducer requiring a "good quality" oil.

SUMMARY

The object of the present disclosure is to remedy these drawbacks by proposing a device for driving the reducer of a turbine engine which is compatible with disassembling the LP shaft, without compromising the sealing of the front vessel thereof. It is preferably important for the nut which holds the LP shaft on the first major module to be accessible by means of tools from the front of the engine without the passage of the tools interfering with the walls of the front vessel.

For this purpose, embodiments of the present disclosure relate to a bypass turbojet engine comprising a fan which is driven, by means of a fan shaft which is supported by at least two first bearings, by a turbine shaft which is supported by at least one second bearing having a fixed ring and a movable ring, the turbine shaft driving the fan shaft through a device for reducing the rotational speed, the reduction device and the first and second bearings being received in a lubrication vessel, the casing of which comprises fixed portions and movable portions which are interconnected by sealing means, the device for reducing speed having an input wheel which is shaped so as to receive the torque transmitted by the turbine shaft by drive means which are connected to the movable ring, wherein the lubrication vessel forms a ring which is coaxial with the turbine shaft, and the drive means have a drive ring forming a portion of the movable sealing walls of the casing of the lubrication vessel.

This makes it possible to form a vessel for which the movable walls, by placing them in continuity with the drive means, are independent of the LP turbine shaft. The drive means of the reduction device, and as a result the entire movable portion of the vessel, can thus be separated from the turbine shaft without breaking the link thereof to the movable ring. This design makes it possible to separate the LP shaft from the bearing thereof without the reduction device being affected.

The fact that the drive means of the reduction device are involved in producing a portion of the sealed vessel makes it possible to prevent the oil from escaping from the vessel when the LP turbine shaft is separated from the bearing thereof, in other words when seeking to separate the shaft from the first major module. It is thus possible to organize the upstream vessel, both in terms of the fixed portion and the movable portion thereof, in such a way that the disassembly of the LP shaft does not lead to the sealing of the vessel being compromised.

Preferably, the movable portions of the lubrication vessel comprise the fan shaft, a downstream extension casing of the fan shaft supporting the sealing means between the fan shaft and the drive means, and the drive means.

The drive means advantageously comprise an end portion which is positioned radially between the movable ring and the turbine shaft, and an opposite end portion supporting the sealing means. The sealing means preferably comprise a labyrinth seal.

Advantageously, the drive means are formed by two shafts which are coaxial with the turbine shaft, a first drive shaft being connected to the movable ring and comprising drive means of a second drive shaft forming the drive ring of the input wheel of the reduction device. This decomposition into two shafts of the drive of the reduction device facilitates the assembly and disassembly of the reduction device.

Preferably, the first drive shaft comprises a portion which is shaped so as to cooperate with the turbine shaft and receive the torque to be transmitted to the reduction device, the portion being positioned between the movable ring and the turbine shaft. The LP shaft being positioned inside the other shafts facilitates the insulation thereof with respect to the other shafts, and this makes it easier to disassemble the LP shaft without compromising the sealing of the front vessel.

In one embodiment in which the turbojet engine further comprises, axially in the region of the second bearing, a journal supporting a rotor of the turbojet engine, the portion of the first drive shaft is positioned between the movable ring and the journal.

Preferably, the lubrication vessel comprises two sealing means of the rotor/stator type in the region of one of the first bearings and the second bearing and a sealing means of the rotor/rotor type which is positioned lengthwise between the turbine shaft and the fan shaft.

More preferably, the means which ensure the rotor/rotor-type seal are supported, firstly, by a downstream extension casing of the fan shaft and, secondly, by one of the drive means. Even more preferably, the rotor/rotor-type seal comprises a labyrinth seal.

In one embodiment, the internal diameter of each of the elements of the movable portions of the vessel is greater than that of the turbine shaft. This design allows tools to pass into the hollow of these shafts and to reach the nut which fixes the LP shaft to the bearing thereof supporting the thrust bearing thereof.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
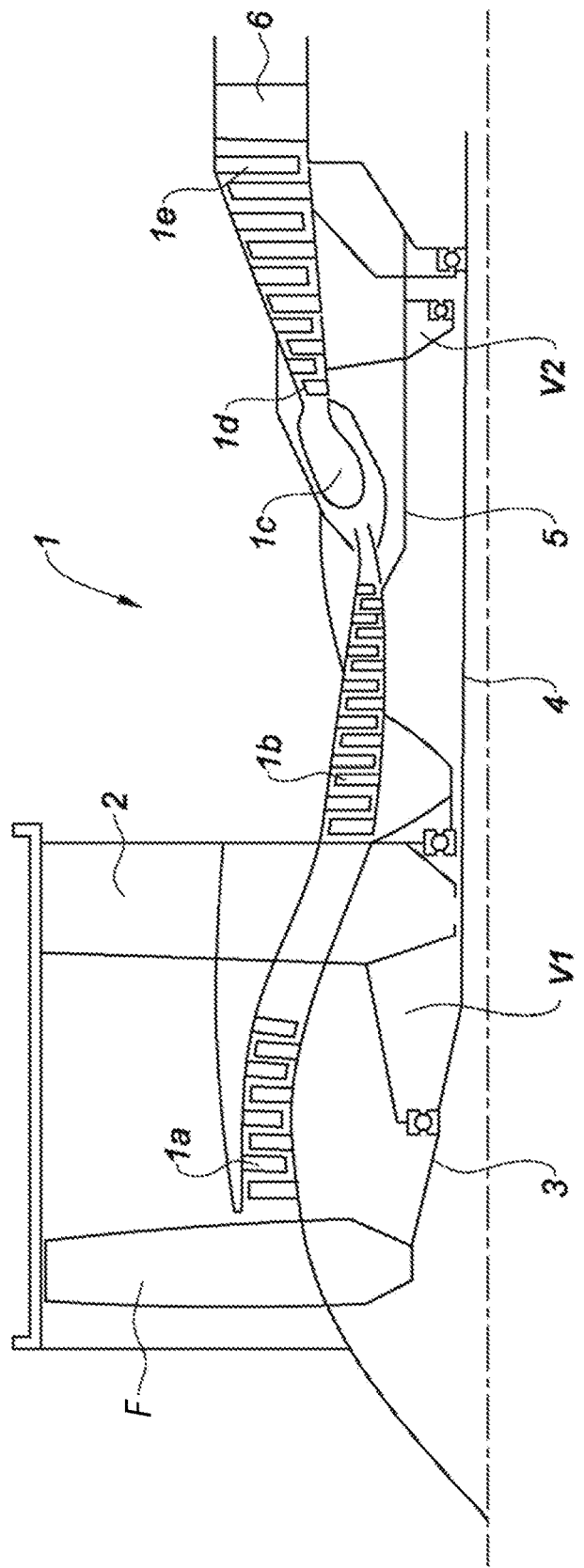
FIG. 1 is a general sectional view of a turbine engine.

With reference to FIG. 1, a turbojet engine 1 from the prior art, without a reducer, can be seen, which conventionally comprises a fan F, a low-pressure compressor 1a, a high-pressure compressor 1b, a combustion chamber 1c, a high-pressure turbine 1d and a low-pressure turbine 1e. The high-pressure compressor 1b and the high-pressure turbine 1d are connected by a high-pressure shaft 5 and form a high-pressure (HP) body therewith. The low-pressure compressor 1a and the low-pressure turbine 1e are connected by a low-pressure shaft 4 and form a low-pressure (LP) body therewith. As for the fan, it is supported by a fan shaft 3 which, in the example shown, is rigidly connected to the LP shaft 4, without a device for reducing the rotational speed between the two shafts.

The HP and LP shafts extend along an axis which is the axis of rotation of the turbojet engine 1. In the rest of the description, the concepts of longitudinal or radial, and internal or external, relate to the axis.

The turbine engine 1 also conventionally comprises an intermediate casing 2 and an exhaust casing 6 which support, inter alia, the bearings of the LP and HP rotating shafts. The bearings are respectively enclosed in a front vessel V1 which is attached to the intermediate casing 2 in the case of the bearings located upstream of the HP body, and in a rear vessel V2 which is attached to the exhaust casing 6, in the case of the bearings located downstream of the HP body. The fixed portion of the front vessel V1 is delimited by casings, referred to as bearing supports, which extend towards the inside of the engine, on either side of the thrust bearing of the LP shaft, and the movable portion thereof is delimited by the upstream end of the LP shaft itself.

Figure 2:
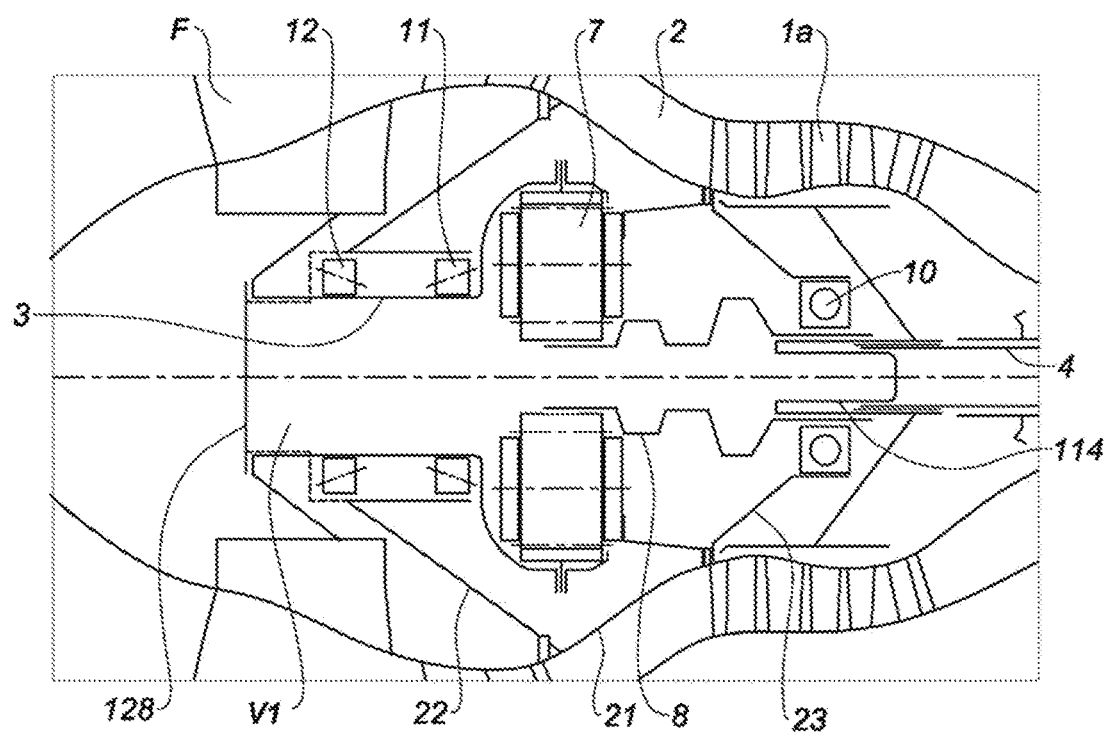
FIG. 2 is a sectional view of the front portion of a turbine engine equipped with a reducer, showing a front vessel according to the prior art.

FIG. 2 shows the front portion of a turbofan from the prior art, wherein a reducer 7 is positioned between the fan shaft 3 and the LP shaft 4. The reducer, as a rule of the epicyclic type, is shown in the schematic form of a rectangle which does not show the bulk thereof. It is driven by a drive ring 8 extending upstream of the LP shaft 4 and which is attached to the movable ring of the bearing 10 supporting the LP shaft. The output torque of the reducer 7 is transmitted to the fan shaft 3, by a conventional link, which is known by a person skilled in the art, such as a fixing of the fan shaft to the planet carrier, in the case of an epicyclic reducer. The reducer is placed inside a front lubrication vessel V1, which is shown in grey in the drawing.

In this version of the prior art, the fixed portion of the vessel V1 is formed by the inner wall 21 of the duct of the primary flow, an upstream bearing support 22 and a wall encasing the downstream bearing support 23. This support 22 and this wall 23 extend towards the inside of the turbine engine whilst encasing, firstly, the bearing of the thrust bearing 10 of the LP body 4 and, secondly, the bearings of the bearings 11 and 12 of the fan shaft 3. As for the movable portion, it is formed by a sealing wall 28 which is positioned at the upstream end of the fan shaft 3 and by the movable rings, firstly, of the bearing 12 of the fan shaft 3 which is located the furthest upstream and, secondly, of the thrust bearing 10 of the LP shaft 4 downstream. The sealing of the vessel V1 is supplemented downstream by the turbine nut 114 which fixes the fan shaft 3 and the major low-pressure compression module to the LP shaft 4. It is now understood that with this design, a disassembly of the LP shaft and the separation thereof from the first major module can only be carried out whilst compromising the sealing of the upstream vessel V1.

Figure 3:
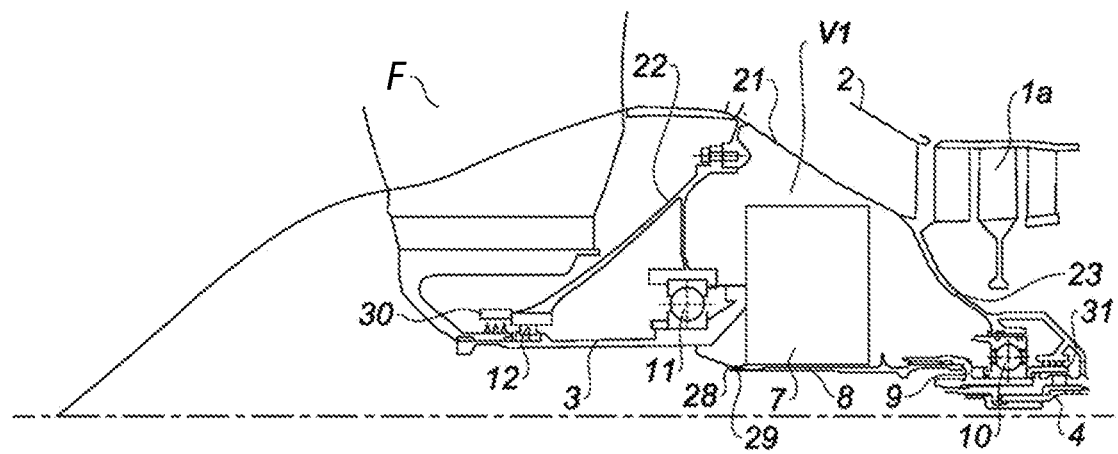
FIG. 3 is a sectional view of the same front portion, showing a front vessel according to an embodiment of the disclosure.

FIG. 3 shows the front portion of a turbofan having a front vessel V1 which is improved according to the disclosure. The fixed portion thereof is still formed by the same walls as in the previous version. As for the movable portion thereof, it is formed, from upstream to downstream, by the fan shaft 3, to which are attached the movable rings of the thrust bearings 11 and roller bearings 12 of the fan shaft, by a downstream extension casing 28 of the fan shaft 3, by the drive ring 8 of the reducer 7 and by an intermediate shaft 9 for extending the drive ring, which is fixed to the movable ring 26 of the thrust bearing 10 of the LP shaft 4. The front vessel V1 is thus in the shape of a hollow ring which is centered on the axis of the rotating shafts, and not in a substantially convex shape encompassing the axis. It thus no longer appears to be necessary to have a sealing wall upstream of the fan shaft. The sealing of the vessel between the fixed portions and the movable portions thereof is thus ensured by 3 seals: two seals of the rotor/stator type at the upstream and downstream ends, in the region of the roller bearing 12 of the fan shaft and of the thrust bearing 10 of the LP shaft, and a seal of the rotor/rotor type between the extension casing 28 and the drive ring 8 of the reducer.

The fixed and movable portions of the front vessel conventionally join together in the region of two labyrinths (or other, more technically advanced seals), which have the reference sign 30 upstream and 31 downstream and which are positioned at the ends thereof so as to form a sealed volume which contains the three above-mentioned bearings and ensures the permanence of the lubrication and cooling thereof. In one embodiment, the sealing between the ring 8, which rotates at the speed of the LP shaft 4, and the downstream extension casing 28, which rotates at the speed of the fan shaft 3, is produced by a movable sealing labyrinth 29. The movable labyrinth 29 ensures the sealing upstream of the ring 8. Typically, the movable labyrinth 29 comprises external annular wipers which are supported by the ring 8 and surrounded with a small radial clearance by the downstream extension casing 28, as can be seen in the drawings.

It is noted that this vessel V1 is supported entirely by the fan module, by the intermediate casing and by the module of the LP compressor, which means that it can be separated from the other modules and the LP shaft 4 without the oil enclosed therein escaping. Furthermore, the diameters of the drive ring 8 of the reducer and of the intermediate shaft 9 of the LP shaft are defined so as to be greater than that of the LP shaft 4, which means that it is possible to introduce cylindrical tools therein in order to reach the nut for fixing the LP shaft 4 to the movable ring 26 of the thrust bearing 10 thereof and to allow the unscrewing thereof without these two parts mating.

Figure 4:
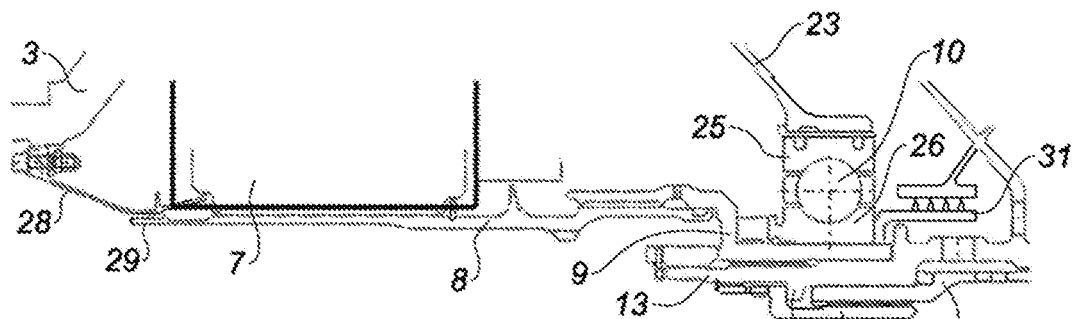
FIG. 4 is a view of a detail of the vessel from FIG. 3, showing the drive means of the reducer.

FIG. 4 shows in greater detail the movable portion of the vessel V1 which is supported by the thrust bearing 10 and the fixed 25 ring and the movable 26 ring thereof. Starting from downstream, the LP shaft 4 meshes, by means of a system of splines, with a journal 13, which is connected to the movable ring 26 of the thrust bearing 10 by means of the intermediate shaft 9, and which rotates in order to drive the rotor of the LP compressor. The LP shaft 4 is held in place, axially, on said journal by means of an assembly nut 14 which is screwed onto a thread which is made on the internal face of the LP shaft 4 and which is supported against an axial stop 15 which widens out towards the inside from the journal 13. The nut, which attaches the LP shaft 4 to the journal 13, can be accessed from the front of the engine, but nevertheless manages the prior disassembly of the cowl from the front point thereof without other parts and in particular elements forming the walls of the vessel V1 needing to be disassembled. The main object of the disclosure, i.e. the ability to disassemble the LP shaft without disassembling the vessel V1, is thus achieved.

The journal 13 supports, towards upstream, the intermediate shaft 9 which forms an extension of the drive ring 8 of the reducer and which is located radially between the journal 13 and the movable ring 26 of the thrust bearing 10 of the LP shaft to which it is rigidly connected. The purpose of the intermediate shaft is to extend the ring 8 and to allow the disassembly thereof with the journal 13 without this separation of the ring into two separate elements, a ring 8 proper and an intermediate shaft 9, being essential to carrying out the disclosure. The downstream end of the intermediate shaft positioned around the LP shaft 4 forms, together with the drive ring 8, a wall element of the downstream vessel V1 which can be detached from the LP shaft 4 but which can remain in position and maintain the volumetric integrity of the front vessel V1 when the LP shaft is removed.

Lastly, the drive ring 8 of the reducer is mounted on the intermediate shaft 9 by means of splines which bring about the cooperation of the two shafts and which allow the ring 8, and thus the reducer 7, to be driven by the LP shaft 4. As indicated previously, the ring has a diameter which is greater than that of the LP shaft 4.

Figure 5:
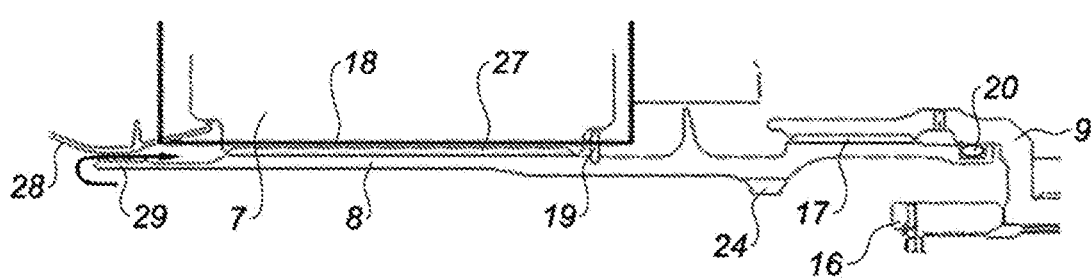
FIG. 5 is a view of a detail of the drive means from FIG. 4.

FIG. 5 shows the assembly of the drive ring 8 of the reducer 7 and the intermediate shaft 9 which transmits the torque supplied by the LP shaft 4 thereto. The assembly of the two shafts is supported by the movable ring 26 of the thrust bearing 10, through which the downstream end of the intermediate shaft 9 passes. This is held in such a way that it rests against a projection of the journal 13, which is located downstream of the thrust bearing, by means of a locking nut 16 which is screwed onto a thread made on the outer wall of the journal 13. The intermediate shaft 9 extends axially upstream, having splines which cooperate with first splines 17 which are positioned on the drive ring 8 at the downstream end thereof. Furthermore, the ring 8 supports, just before the upstream end thereof, second splines 18 which are oriented towards the outside, which cooperate with a toothed wheel 27 of the reducer 7 that the drive ring 8 drives and through which passes the drive torque of the fan supplied by the LP shaft 4. Lastly, as indicated previously, the upstream end of the drive ring 8 supports wipers in order to form, together with the downstream extension casing 28, a movable sealing labyrinth 29 and thus be involved in closing the upstream vessel V1. The drive ring 8 and the downstream extension casing are co-rotating but rotate, as indicated above, at different speeds, the drive ring 8 having the wipers rotating at the greatest speed, which contributes to closing the clearance in operation. The ventilation inside the ring 8 further pressurizes the vessel V1 and prevents oil leaks, passing through the channel inside the fan shaft towards the inside of the vessel V1, as shown by an arrow in FIG. 5.

Axially, the drive ring 8 is held in such a way that it is supported against the reducer 7 by an axial retainer ring 19, which is supported by the drive ring and which is supported against a radial face of the reducer, in such a way that the second splines 18 are well positioned opposite the toothed wheel 27 of the reducer 7. At the downstream end thereof, the drive ring 8 is fitted in the intermediate shaft 9, which has a radial face against which the downstream end of the ring 8 can rest. An 0 ring 20 ensures the radial sealing between the two parts and an axial clearance is left between the downstream end of the drive ring 8 and the corresponding radial face of the intermediate shaft 9 so as to allow any possible differential expansions.

Lastly, a clutch 24 formed by a series of teeth extending circumferentially is positioned inside the drive ring 8 so as to be able to immobilize in rotation the assembly of the movable parts of the fan module and of the LP module when seeking to disassemble the LP shaft 4. Specialized tools are introduced, from upstream of the engine, into the hollow internal cylinder of the fan shaft 3, which rests against the clutch 24 in order to prevent the rotation of the fan and LP rotors when it engages, at the end thereof, the assembly nut 14 in order to unscrew the nut and release the LP shaft 4.

Lastly, the disclosure is characterized by the presence of one or more drive shafts of the reducer 7 which is thus no longer supported by the LP shaft 4 but is supported, either directly or for the purpose of being able to be disassembled by means of an intermediate shaft 9, by the movable ring 26 of the thrust bearing of the LP shaft. It is thus possible, by providing the necessary sealing between fixed parts and movable parts and between co-rotating movable parts, to organize a front vessel V1 comprising a reducer, all of the walls of which are no longer directly attached to the LP shaft 4. The disassembly thereof can thus be carried out without draining the oil located in the cavity of the front vessel V1.

As indicated previously, for the purpose of being able to access the assembly nut 14 of the LP shaft, the drive shaft(s) of the reducer 7, which thus form(s) the internal wall of the vessel, has/have a diameter which is greater than that of the nut, so as to allow the passage of specialized tools.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A bypass turbojet engine comprising:
   a fan driven by a fan shaft supported by at least two first bearings each having a rotating ring and a fixed ring,
   a turbine shaft supported by a second bearing having a fixed ring and a rotating ring,
   said turbine shaft driving said fan shaft through a rotational speed reducer, said rotational speed reducer and said first and second bearings being received in a lubrication vessel,
   said lubrication vessel forming a ring that is coaxial with the turbine shaft, and comprising a casing having fixed portions and movable portions, said fixed and movable portions being interconnected by first, second and third seals,
   said rotational speed reducer having an input wheel shaped so as to receive the torque transmitted, through drive means, by said turbine shaft,
   wherein said movable portions of the casing comprise, from upstream to downstream:
   said fan shaft extending from said first seal and carrying the rotating ring of each of said at least two first bearings,
   a downstream extension casing extending between said fan shaft and said second seal,
   said drive means extending between said second seal and said rotating ring of the second bearing, said drive means comprising a drive ring engaged with said input wheel and an intermediate drive shaft carrying said rotating ring of the second bearing, and
   a downstream end of the intermediate drive shaft connected to said third seal.

2. The turbojet engine according to claim 1, wherein a first end portion of the intermediate drive shaft is positioned radially between said rotating ring of the second bearing and said upstream end of the turbine shaft, and wherein a second, opposite end portion of the intermediate drive shaft supports the third seal.

3. The turbojet engine according to claim 1, wherein the intermediate drive shaft and the drive ring are coaxial with said turbine shaft.

4. The turbojet engine according to claim 3, wherein an O-ring is disposed between a downstream portion of the drive ring and a corresponding radial face of the intermediate drive shaft.

5. The turbojet engine according to claim 3, wherein said intermediate drive shaft comprises a portion which is shaped so as to cooperate with the turbine shaft and receive the torque to be transmitted to the rotational speed reducer, said portion being positioned between said rotating ring of the second bearing and said turbine shaft.

6. The turbojet engine according to claim 5, further comprising, axially in the region of said second bearing, a journal supporting a rotor of the turbojet engine, wherein said portion of the intermediate drive shaft is positioned between said rotating ring of the second bearing and said journal.

7. The turbojet engine according to claim 1, wherein said first and third seals are of a rotor/stator type and are positioned in the region of one of the at least two first bearings and the second bearing respectively, and wherein said second seal is of the rotor/rotor type and is positioned lengthwise between said turbine shaft and said fan shaft.

8. The turbojet engine according to claim 7, wherein said second seal is configured to be supported, firstly, by the downstream extension casing of said fan shaft and, secondly, by said drive ring.

9. The turbojet engine according to claim 7, wherein said second seal comprises a movable labyrinth seal.

10. The turbojet engine according to claim 1, wherein the internal diameter of each of the elements of the movable portions of said lubrication vessel is greater than that of the turbine shaft.

11. The turbojet engine according to claim 1, wherein a clutch formed by a series of circumferentially extending teeth is positioned inside the drive ring.

12. The turbojet engine according to claim 1, wherein the drive ring is retained axially in support against the rotational speed reducer by an axial retainer ring.

\* \* \* \* \*